United States Patent [19]
Johnson

[11] Patent Number: 5,384,106
[45] Date of Patent: * Jan. 24, 1995

[54] METHOD FOR REMOVING POLLUTANTS FROM A GAS STREAM USING A FRACTIONAL CONDENSING HEAT EXCHANGER

[75] Inventor: Arthur F. Johnson, Boulder, Colo.

[73] Assignee: Energy Conservation Partnership Ltd., Boulder, Colo.

[*] Notice: The portion of the term of this patent subsequent to Jun. 16, 2009 has been disclaimed.

[21] Appl. No.: 223,075

[22] Filed: Apr. 4, 1994

Related U.S. Application Data

[60] Continuation-in-part of Ser. No. 97,783, Jul. 26, 1993, Pat. No. 5,344,617, which is a division of Ser. No. 888,931, May 26, 1992, Pat. No. 5,230,870, and a continuation-in-part of Ser. No. 730,417, Jul. 16, 1991, Pat. No. 5,273,727.

[51] Int. Cl.$^6$ .............................. C01B 17/00
[52] U.S. Cl. ................. 423/235; 423/243.06; 422/169
[58] Field of Search ............ 423/243.06, 243.11, 423/243.01, 235, 215.5; 422/169

[56] References Cited

U.S. PATENT DOCUMENTS

| | | | |
|---|---|---|---|
| 1,709,865 | 4/1929 | Muffly | 29/890.035 |
| 1,712,085 | 5/1929 | Litle | 62/523 |
| 2,109,780 | 3/1938 | Mott | 36/1 |
| 2,159,043 | 5/1939 | Orr | 29/189 |
| 2,174,792 | 10/1939 | Lampton | 29/1575 |
| 2,212,481 | 8/1940 | Sendzimir | 27/188 |
| 2,234,839 | 3/1941 | Edwards | 18/56 |
| 2,244,475 | 6/1941 | Raskin | 62/126 |
| 2,294,137 | 8/1942 | Spofford | 148/4 |
| 2,399,650 | 5/1946 | Moyer | 250/83 |
| 2,438,851 | 3/1948 | Gates | 257/6 |
| 2,582,358 | 1/1952 | Schoellerman | 113/51 |
| 3,442,232 | 5/1969 | White | 110/18 |
| 3,456,928 | 7/1969 | Selway | 261/22 |
| 3,607,034 | 9/1971 | Henry et al. | 423/522 |
| 3,676,059 | 7/1972 | Welty | 423/242 |
| 3,770,385 | 11/1973 | Grey et al. | 23/260 |
| 3,839,849 | 10/1974 | Maniya | 55/222 |
| 3,880,618 | 4/1975 | McCrea et al. | 55/68 |
| 3,962,112 | 6/1976 | Shaheen | 423/243.06 |
| 4,051,225 | 9/1977 | Shiga et al. | 423/235 |

(List continued on next page.)

FOREIGN PATENT DOCUMENTS

| | | |
|---|---|---|
| 0286892 | 3/1988 | European Pat. Off. . |
| 3541252A1 | 9/1986 | Germany . |
| 35972 | 6/1906 | Hungary . |
| 55-105535 | 8/1980 | Japan . |

OTHER PUBLICATIONS

Charles Hodgerman, Robert Weast, Samuel Selby; Handbook of Chemistry and Physics; 43rd Edition; pp. 1704–1709, 1712–1713 no date.

P. G. L. Thorne & E. R. Roberts; Fritz Ephraim Inorganic Chemistry; 1943; pp. ix–xii, 178 and 694.

(List continued on next page.)

*Primary Examiner*—Michael Lewis
*Assistant Examiner*—Thomas G. Dunn, Jr.
*Attorney, Agent, or Firm*—Pennie & Edmonds

[57] ABSTRACT

The present invention specifically relates to a method and apparatus for removing pollutants of sulfur, nitrogen and metals from a fossil fuel fired power plant flue gas containing the same. In one embodiment, the process comprises introducing an ammoniacal substance into the flue gas in an amount sufficient to react with a substantial portion of the sulfur and nitrogen pollutants therein; cooling the flue gas by passing the gas past the exterior surfaces of a plurality of heat exchanger tubes which contain a cooling fluid therein and which are configured to define a serpentine passage in a downwardly descending manner at an angle of between about 10 to 60 degrees from the horizontal to condense ammonium sulfate or sulfite compounds from the flue gas; and collecting and removing the condensed compounds from the flue gas at several locations below the heat exchanger tubes as the flue gas passes thereby along the passage. In another embodiment, an apparatus for carrying out the process is disclosed.

10 Claims, 2 Drawing Sheets

U.S. PATENT DOCUMENTS

| | | | |
|---|---|---|---|
| 4,089,088 | 5/1978 | Konczalski | 23/277 |
| 4,101,635 | 7/1978 | Nambu et al. | 423/242 |
| 4,140,175 | 2/1979 | Darm | 165/45 |
| 4,160,810 | 7/1979 | Benson et al. | 423/220 |
| 4,250,160 | 2/1981 | Eakman | 423/547 |
| 4,339,883 | 7/1982 | Waldmann | 34/27 |
| 4,409,191 | 10/1983 | Osman | 423/720 |
| 4,444,128 | 4/1984 | Monro | 110/345 |
| 4,452,620 | 6/1984 | Dosmond | 62/238.6 |
| 4,454,100 | 6/1984 | Faatz | 423/210 |
| 4,466,815 | 8/1984 | Southam | 55/212 |
| 4,487,139 | 12/1984 | Warner | 110/345 |
| 4,526,112 | 7/1985 | Warner | 110/345 |
| 4,557,202 | 12/1985 | Warner | 110/216 |
| 4,582,122 | 4/1986 | Fan | 165/1 |
| 4,597,433 | 7/1986 | Johnson | 165/4 |
| 4,600,561 | 7/1986 | Frei | 422/170 |
| 4,619,671 | 10/1986 | Ruff et al. | 55/222 |
| 4,744,967 | 5/1988 | Brand et al. | 423/239 |
| 4,776,391 | 10/1988 | Warner | 165/111 |
| 4,781,797 | 11/1988 | Johnson | 202/173 |
| 4,783,326 | 11/1988 | Srednicki | 423/242 |
| 4,793,981 | 12/1988 | Doyle et al. | 423/239 |
| 4,802,897 | 2/1989 | Johnson | 55/55 |
| 4,829,911 | 5/1989 | Nielson | 110/234 |
| 4,871,522 | 10/1989 | Doyle | 423/239 |
| 4,874,585 | 10/1989 | Johnson et al. | 422/171 |
| 4,876,986 | 10/1989 | Johnson | 122/20 B |
| 4,900,403 | 2/1990 | Johnson | 203/78 |
| 4,910,011 | 3/1990 | Dörr et al. | 423/522 |
| 4,932,334 | 6/1990 | Patte et al. | 110/216 |
| 5,051,245 | 9/1991 | Wilson et al. | 423/242 |
| 5,122,352 | 6/1992 | Johnson | 423/242 |

OTHER PUBLICATIONS

Ralph F. Bovier; Proceedings of the American Power Conference; Apr. 14, 15 & 16 1964; article entitled "Sulfur–Smoke Removal System"; pp. 138–143.

Raisaku Kiyoura, Haruo Kuronuma and Gisuke Uwanishi; Bulletin of the Tokyo Institute of Technology; No. 81, 1967; article entitled "Studies on the Recovery of Sulphur Dioxide from Hot Gases, to Control Air Pollution," pp. 1–5.

METHOD FOR REMOVING POLLUTANTS FROM A GAS STREAM USING A FRACTIONAL CONDENSING HEAT EXCHANGER

CROSS-REFERENCE TO RELATED APPLICATIONS

This application is a continuation-in-part of application Ser. No. 08/097,783 filed Jul. 26, 1993, now U.S. Pat. No. 5,344,617 which is a division of application Ser. No. 07/888,931 filed May 26, 1992, now U.S. Pat. No. 5,230,870 and a continuation-in-part of application Ser. No. 07/730,417 filed Jul. 16, 1991, now U.S. Pat. No. 5,273,727.

FIELD OF THE INVENTION

This invention relates to an apparatus and method for exchanging heat and removing pollutants such as acidic oxides of sulphur and nitrogen and noxious compounds of lead, arsenic, cadmium, selenium, beryllium, mercury and uranium from the flue gas of coal-fired power plants.

BACKGROUND ART

Boiler plants, particularly those having coal-fired boilers, are well-known sources of pollution. Sulfur emissions from these plants has become a matter of heightened concern in recent years, in light of the perceived effects of "acid rain." Although pollutant emission reduction has long been the object of scientific inquiry, there is still a great demand for methods and apparatus that are effective, easily retrofit onto existing plants, and which convert the collected pollutants into useful and valuable byproducts.

The prior art recognizes that cooling flue gases that contain sulfur trioxide and water vapor will result in condensation of sulfuric acid. See U.S. Pat. No. 4,526,112 to Warner; U.S. Pat. No. 4,874,585 to Johnson, et al.; U.S. Pat. No. 4,910,011 to Dorr, et al; and Bovier, Sulfur-Smoke Removal System, 26 Proc. Am. Power Conf. 138 (1964). Other systems of the prior art employ high-volume sprays of water or other liquid agents to scrub particulate matter and pollutants from the flue gas. See U.S. Pat. No. 3,442,232 to White; U.S. Pat. No. 3,456,928 to Selway; and U.S. Pat. No. 3,770,385 to Grey et al.

It has further been recognized that when a tube-type heat exchanger is located in the path of a flue gas flow, the particulate material in the gas can collect on the heat exchanger tubes. Cleansing sprays have been provided in accompaniment with the heat exchangers according to some prior art methods, in order to wash the collected particulates from the heat exchangers. See U.S. Pat. No. 4,452,620 to Dosmond; and U.S. Pat. No. 4,526,112 to Warner.

Although all of the aforementioned systems are more or less effective in removing some degree of the pollutants from the flue gas, they merely shift the environmental burden from atmospheric waste to surface waste. Attempts have therefore been made to convert pollutants into useful end products as they are removed from flue gases. One such approach involves the introduction of ammonia to combine with sulfur oxides in the flue gas and form ammonium bisulfite or ammonium bisulfate. See Studies on the Recovery of Sulfur Dioxide from Hot Flue Gases to Control Air Pollution, R. Kiyoura, et al., 81 Bull. Tokyo Inst. of Tech. 1 (1967); Slack et al., *Sulfur Dioxide Removal From Waste Gases* 176 (1975). The combination of ammonia and sulfur oxides according to these references produced a dry ammonium bisulfite or ammonium bisulfate product. Neither of these systems has been commercially adopted, however, due to drawbacks that have until now remained unsolved. Chief among these drawbacks is the impediment to gas flow which the solid precipitate causes, especially where closely-packed heat exchanger tube arrangements are employed. In addition, the full potential of this approach for substantially complete removal of pollutants including sulfur and nitrogen from flue gas has not been realized.

SUMMARY OF THE INVENTION

It is an object of this invention to devise means and an apparatus to remove the above flue gas impurities as valuable byproducts and eliminate danger to public from these not being provided at present.

It is a further object of the invention to utilize the heat in the flue gas to produce energy such as mechanical energy and electrical energy apart from that now being produced by coal and oil burning power plants, but adding to their existing "heat-rates", (kilowatt hours per weight of fuel burned) thus reducing fuel needed.

A further object of the invention is to alter the design of the 100 year old, classic water-tube heat exchanger so that it will be able to cool the flue gas to temperature of coldest cooling water available on its lower end while making steam at its upper end where the hot flue gas enters.

Yet a further object is to alter the design of said classic water-tube heat exchanger by lining it with a waterproof heat insulation so the about 8% moisture in coal-fired flue gas, upon condensing, can be withdrawn from the bottom of the water tube boiler with dissolved and insoluble byproducts in successive amounts of dilution.

Yet another object is means to inject ammonia gas to the hot flue gas in just the amount to make ammonium sulphate and ammonium nitrate or nitrite at the lower or lowest temperatures of flue gas.

Another object of the invention is to deliver ammonia gas in such dilute solutions so that leakage or spillage would not cause hazards to workers or the public during transport or storage.

Still another and most important objective of the invention is to provide apparatus of proven lower capital and operating costs in all fossil fuel burning power plants by directing low pressure steam into reciprocating pumps that elevate water to a high enough reservoir that hydroelectric power may be made at 80% to 90% efficiency instead of 40%-50% as per low pressure steam generators.

In contrast with my earlier inventions which provide means for conducting the flue gas generally downward in one or more steps, this process draws the flue gas downwardly along a slope of approximately 30 degrees from the horizontal. Augmented by its loss in temperature and weight per cubic foot but impeded by baffles, the gas follows a zig-zag horizontal course across the water-filled tubes. This arrangement avoids the need for an induced draft fan to impel flue gas up a smoke stack.

DETAILED DESCRIPTION OF THE INVENTION

Figure 1:
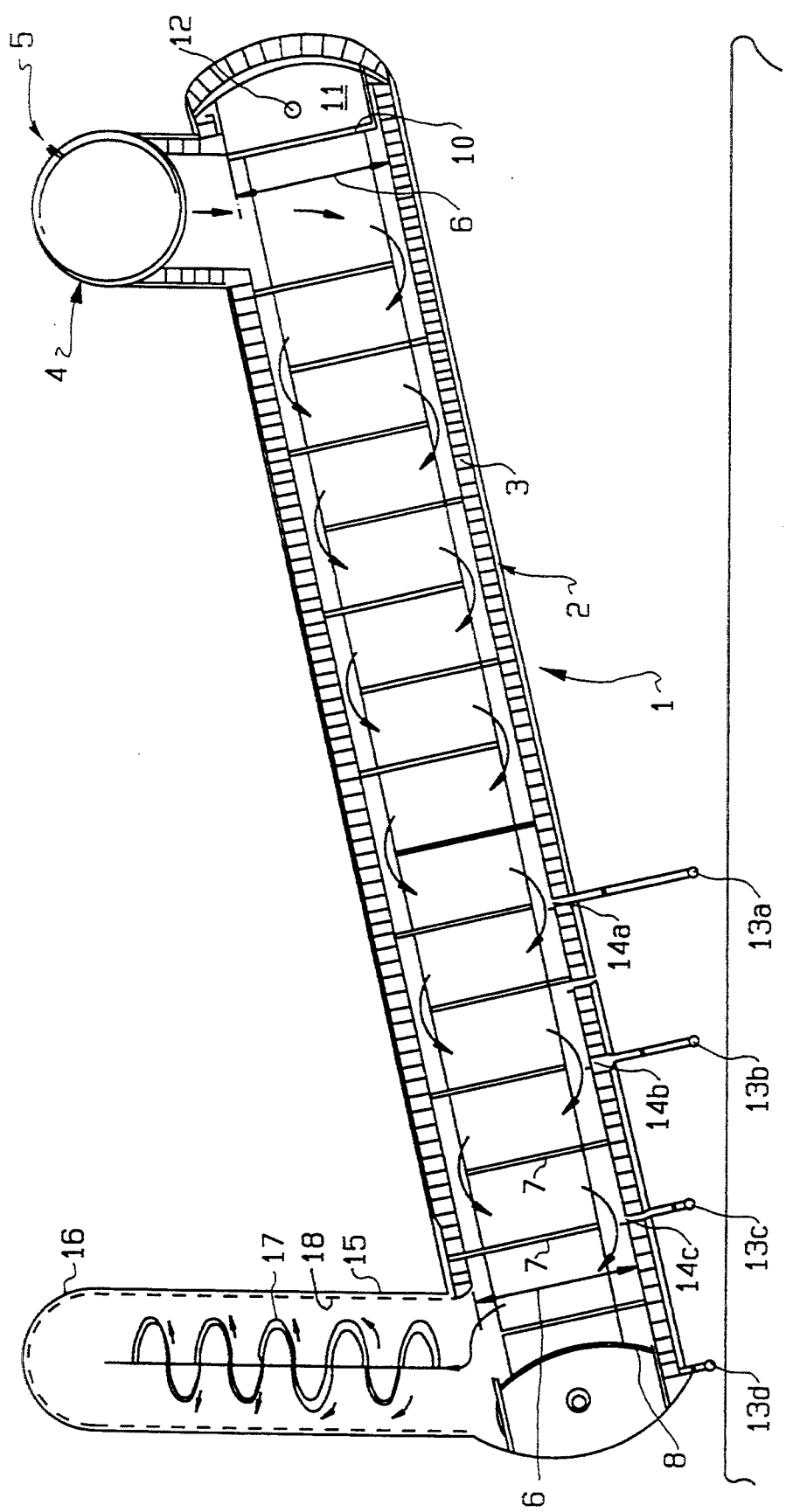
FIG. 1 is a cross-sectional view of the apparatus of the invention to illustrate the various components.

The present invention specifically relates to a method and apparatus for removing pollutants of sulfur, nitrogen and metals from a fossil fuel fired power plant flue gas containing the same. In one embodiment, the process comprises introducing an ammoniacal substance into the flue gas in an amount sufficient to react with substantially all of the sulfur and nitrogen pollutants therein; cooling the flue gas by passing the gas past the exterior surfaces of a plurality of heat exchanger tubes which contain a cooling fluid therein and which are configured to define a serpentine passage in a downwardly descending manner at an angle of between about 10 to 60 degrees from the horizontal to condense ammonium sulfate compounds or ammonium sulfite compounds from the flue gas; and collecting and removing the condensed compounds from the flue gas at several locations below the heat exchanger tubes as the flue gas passes thereby along the passage. The flue gas can be condensed to form a concentrated ammonium sulphate solution in the first location for collecting and removing condensate, while other pollutants, such as mercury, can be condensed from the flue gas in one of the lower locations for collecting and removing condensate.

Ambient temperature water is preferably used as the cooling fluid. It is heated to produce steam for developing power for use in other ares of the plant. Advantageously, the temperature of steam produced is not less than 10° F. lower than the temperature of the entering flue gas, and it is used to drive a fan, pump or electric generator to develop power. Preferably, the pump is a reciprocating steam pump which pumps water to a hydroelectric generator at between about 5 and 1000 times the pressure per square inch of the steam.

It is also preferred for the ammoniacal substance to be introduced in a gaseous state into the flue gas. This is conveniently done by heating a solution of between about 0.5 to 20% by weight of ammonia or ammonium hydroxide and water and introducing the ammonia gas which is produced into the flue gas using a pipe or nozzle.

Another aspect of the invention relates to a heat exchanger apparatus which includes means for introducing an ammoniacal substance into the flue gas in an amount sufficient to react with a substantial portion of the sulfur and nitrogen oxides therein; means for cooling the flue gas including a plurality of heat exchanger tubes which contain a cooling fluid therein and which are configured to define a serpentine passage in a downwardly descending manner at an angle of between about 10 to 60 degrees from the horizontal; and means for collecting and removing condensed compounds from the flue gas at several locations below the heat exchanger tubes.

The means for cooling the flue gas includes a shell within which the plurality of heat exchanger tubes are arranged in staggered positions extending from the shell so that the location of the gas passage alternates along the length of the shell. The tubes are protected by plates which form a portion of the gas passage and around which the flue gas must pass. The shell preferably includes a lining of heat insulative material to protect it from heat deterioration and to insulate it from heat loss to the surrounding environment. The heat insulative material of the shell lining generally comprises fire brick or a suitable castable refractory material.

The means for collecting and removing condensate comprises a plurality of drain holes located along and extending through the shell, wherein each drain hole includes dam means for resisting flow of the condensate to adjacent but lower positioned drain holes. Also, the plurality of heat exchanger tubes provide a sufficient tubing surface are so that the temperature of steam produced by heating the cooling water therein is not less than 10° F. of the temperature of the flue gas which enters the apparatus.

This apparatus may be operatively associated with means for developing power for use in the plant, with the power developing means being operated by the steam which is produced by the heating of the cooling fluid of the heat exchanger tubes. Typical power developing means incudes a fan, pump or electric generator. Also, the apparatus may be operatively associated with means for heating a solution of the ammoniacal substance so that the ammoniacal substance can be introduced in a gaseous state.

In FIG. 1, a classical water-tube boiler 1 is shown in a form which is modified to suit the objects of this invention. Arrows indicate the zig-zag movement of flue gas flow through the boiler. The boiler includes arrays of small tubes filled with cold water on the lower end and which generate steam at the upper end. The flue gas flows 14 times at right angles to the array of water tubes reversing direction 13 times while traveling downwardly at a slope of roughly 30 degrees parallel to small tubes. As noted above, the angle can be between 10 and 60 degrees with respect to the horizontal.

A heavy, cylindrical steel shell 2 of the water-tube boiler is used to support the fire-brick 3 or other waterproof refractory lining to protect the shell from heat distortion as well as to practically eliminate heat loss to the atmosphere. 4 is a horizontal stainless steel duct carrying flue gas from a power plant to its usual smoke stack at a velocity of about 10 ft./sec. In this invention, the gas in duct 4 passes to the water-tube boiler 1. The metal parts of the boiler 1 are not subjected to acid corrosion from exposure to the flue gas due to the injection at 5 of just enough ammonia to combine with the acidic oxides of sulphur or nitrogen which are present in the flue gas. The details of such injection are known from my prior U.S. Pat. Nos. 5,122,352, 5,198,201, 5,230,870 and 5,273,727, and need not be repeated herein. To the extent necessary to further understand this invention, the disclosures of these patents are expressly incorporated herein by reference. Specifically, the present boiler is designed so that a concentrated solution of ammonium sulfates and sulfites is initially condensed in the boiler 1.

The inside diameter 5 of the refractory lined water-tube boiler 1 encompasses a tube bundle 6 of the small water tubes. These tubes have an outside diameter of about one inch. Fourteen steel vanes 7 guide the flue gas stream back and forth against the tube bundle 6. These steel vanes have holes through which each of the tubes pass to maintain accurate tube spacing during construction of the bundle and before the lower ends of the tubes are welded to the cold water chest 8. This chest is provided with the coldest available water that has been treated to prevent internal corrosion.

The tubes terminate in a tube sheet 10 which is a steel plate having holes within which the tubes snugly fit and are welded. The open area adjacent the tube sheet 10 collects the steam which is generated from the cooling water and is referred to as a steam chest 11. This chest 11 is constructed to withstand temperatures of over 450° F. and pressures of at least 600 psi. Steam in this chest 11 is removed at steam outlet 12 and is used for developing mechanical horsepower that may operate a fan, a pump or an electrical generator.

Condensate is removed from the boiler 1 via drain pipes 13a, 13b, 13c, and 13d. These pipes include adjustable valves for allowing removal of the moisture condensing from the flue gas. At drain 13a, a concentrated condensate of ammonium sulphate and insoluble noxious impurities is recovered.

The water-proof refractory lining 3 includes dams 14a, 14b, 14c which are configured in a V-shape for assisting in the collection of both dissolved and insoluble, but finely divided, soot and insoluble noxious metals in flue gas. As noted above, mercury liquid can be collected at the lowermost drain 14c.

A vertical outlet pipe 15 conducts the cooled and cleaned flue gas to an induced draft fan which is present in duct 16 after it is demisted by centrifugal force by the swirling path imparted to the gas by the tube arrays. Suspended scrolls 17 can assist in imparting this movement to the gas. Excess moisture in the gas can be collected and removed by a downward drain formed as a suspended screen or perforated plate 18 which is welded to duct 15.

This boiler 1 provides a number of advantages due to its novel construction. The hot gas combusted from the plant is drawn down into the boiler at the upper end and exits at the lower end being drawn thus by an induced draft fan (an existing or new one). Thereafter, the gas is directed to an existing chimney of the power plant. This design eliminates flue gas pollutants of sulphur dioxide and noxious impurities such as lead and arsenic in coal which is burned in the plant.

While conventional one inch outside diameter boiler tubes extend from a water chest on the lower end to the steam chest on the upper end, the hot gas usually travels essentially along a straight path. In this invention, the gas is forced to travel at right angles to the water tube bundle by perforated steel plates which are slipped over the boiler tube bundle. These spacing of these plates can be maintained by steel rods (not shown). The perforations or holes in these steel plates are a fraction of an inch large than the tubes so no deformation due to heat variations in tubes or steel rods create stresses. FIG. 1 shows how the flue gas crosses the tubes 14 times.

This water-tube boiler 1 has pipes extending downwardly from the tube in at least four places to collect the moisture which condenses from the coal-fired flue gas. Since ammonia or another ammoniacal substance is introduced into the hot flue gas at the upper end of the boiler or before in such a manner in thoroughly mixes with the flue gas, non-corrosive ammonium sulphate and/or sulphite condenses in the boiler.

A scroll made of a ribbon of steel is mounted in the flue gas outlet to impart enough horizontal swirling to demist the flue gas of most of the remaining moisture before the gas exits to the stack.

Figure 2:
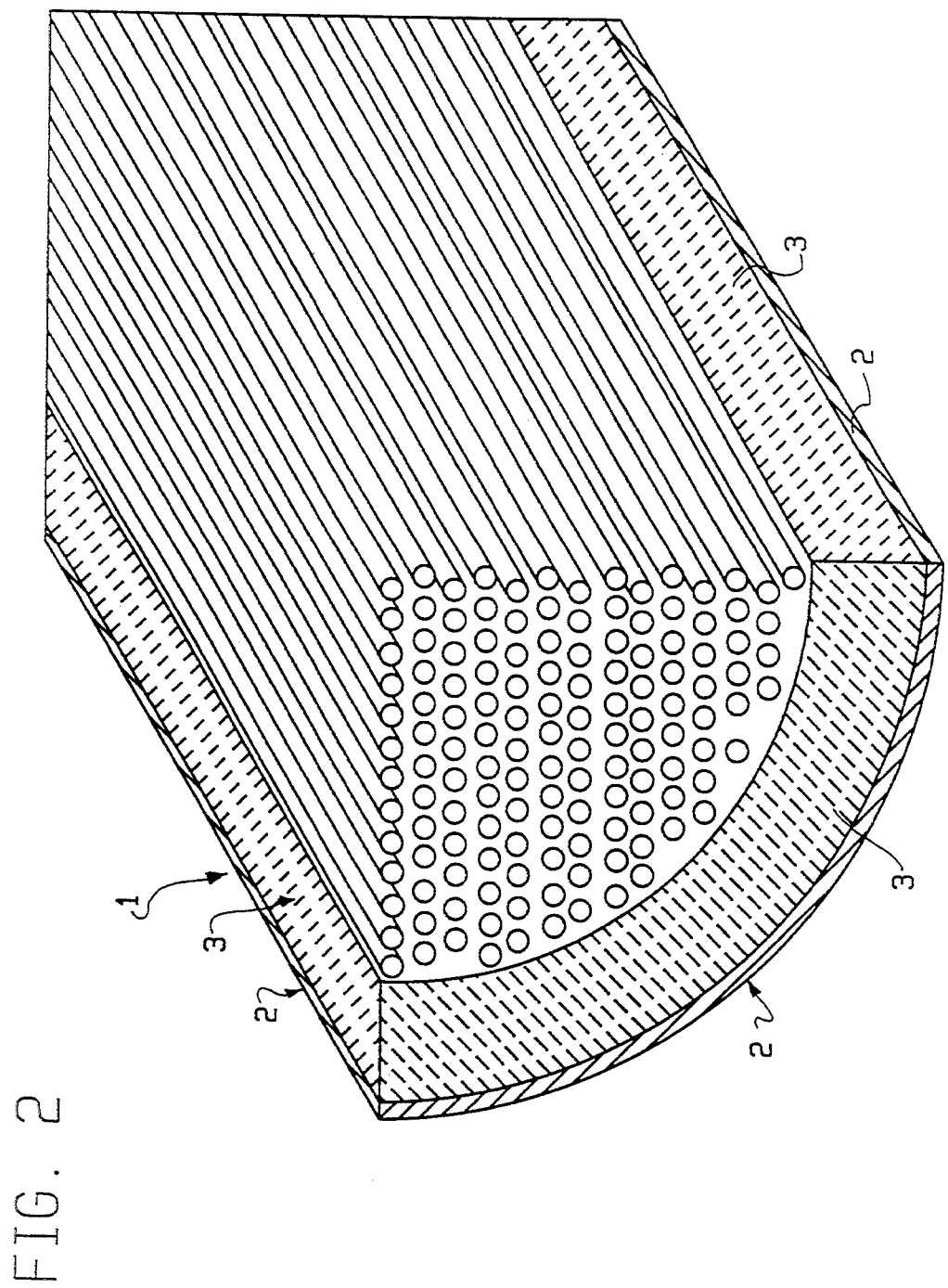
FIG. 2 is an isometric projection showing an end view of the water-tube boiler apparatus of FIG. 1.

FIG. 2 is a vertical cross-section and isometric projection of the tubes which is enlarged to make more visible the arrangement of tubes and their relation to the hot flue gas. As noted above, the gas travels downwardly and upwardly around the plates and the staggered array of tubes, and is forced to sweep the outer surface of the tubes to heat the water therein.

To attain the second object of the invention, i.e., to make use of the heat in the flue gas, this heat must be transferred from the flue gas to the water inside the tubes. The ability of the design of FIG. 1 and FIG. 2 to do this is calculated below, but first the quantity of heat in the flue gas that is to be transferred is estimated in Table I below. The flue gas temperature is typically 370° F. entering the heat exchanger and 70° F. when it exits (i.e., the cooling water temperature).

The following calculations illustrate the invention:

TABLE I

|  | Estimated lbs flue gas per lb Ziegler coal fired in the power plant | MOLS OF GAS | Btu/Mol @ 150° F. | TOTAL BTU |
|---|---|---|---|---|
| $N_2$ | 9.0175 /mol wt | 28 = 0.3220 × | 6.90 = | 2.1896 Btu |
| $CO_2$ | 2.5461 /mol wt | 44 = 0.0579 × | 9.90 = | 0.5732 Btu |
| $O_2$ | 0.5258 /mol wt | 32 = 0.0164 × | 6.90 = | 0.1115 Btu |
| $H_2O$ | 0.7483 /mol wt | 18 = 0.0416 × | 8.45 = | 0.3515 Btu (Condenses a 212 F.) |
| $SO_2$ | 0.0790 /mol wt | 64 = 0.0012 × | 9.90 = | 0.0119 Btu |
|  | 12.9167 lbs. gas | 0.4391 MOLS |  | 3.2377 BTU per lb. flue gas |

So: 12.9167×3.2377=41.82 Btu/12.9167 gas Flue Gas temperature=0.07742 Btu/lb gas cooling (in/out of heat exchanger) flue gas/lb coal is 370−70=300° F.×0.077422=23.22 BtU/lb gas from firing one lb. Ziegler coal Heat of Condensation of water: $H_2O$ is 0.7483*lbs @ 1000 Btu=748.3/12.9167 lbs gas=57.71 Btu/lb gas. Thus, the total heat recoverable in the heat exchanger is 23.22+57.71=80.93 Btu/lb gas. For firing one lb Ziegler coal, therefore, cooling the gas from 370° F. to 70° F. requires 1044 Btu (80.93×12.9) Heating value of Ziegler Coal=12,100/lb., so 1044/12,110=8.6% fuel saved to heat water from 70° F. to 212° F. To make steam at 300° F.=212−70=140×1 Btu/F=140 Btu/lb water which totals 1171, i.e., more than the 1044 recovered from the heat exchanger for cooling one pound of gas from firing a pound of ziegler coal. Thus, 1.12 lbs. Ziegler coal (1171/1044) makes steam at 300° F. Firing 1658 lbs of Ziegler coal per minute in a 137.5 kw power plant produces the above 12.9167 lbs. gas, and 2000 lbs coal would make 2000/1.12−1786 to make steam at 300° F.

TABLE II

| FLUE GAS CALCULATIONS FOR 137.5 KW POWER PLANT FIRING A ZIEGLER COAL ULTIMATE ANALYSIS OF A ZIEGLER COAL | | | | | | | | |
|---|---|---|---|---|---|---|---|---|
| $H_2O$ | C | $H_2$ | $N_2$ | $Cl_2$ | S | $O_2$ | Ash | Total |
| 11.10 | 63.26 | 4.37 | 1.21 | 0.04 | 3.60 | 7.52 | 8.90 | 100 |

TABLE II-continued

| FLUE GAS CALCULATIONS FOR 137.5 KW POWER PLANT FIRING A ZIEGLER COAL ULTIMATE ANALYSIS OF A ZIEGLER COAL | | | | | | | | |
|---|---|---|---|---|---|---|---|---|
| $H_2O$ | C | $H_2$ | $N_2$ | $Cl_2$ | S | $O_2$ | Ash | Total |
| 0.1218 | .6944 | .0480 | .0133 | .00044 | .03952 | .0826 | * | |

\* - less ash lb/lb of coal

The estimated heating value of the above coal can be calculated by a Dulong type formula wherein: 14,000 C+62,000($H_2$—$O_2$)/8+4050 S="higher" heating value

| | | |
|---|---|---|
| 14,000 × 0.6944 = | 9722 | |
| 62,000 × (0.03952 = | 2356 | |
| 4050 × 0.03952 = | 160 | |
| heating value per lb coal | 12238 | "higher" value |

0.1218 lbs. $H_2O$ @1050=128  2,238−128=12,110 "lower" value

| CALCULATION OF WEIGHTS OF FLUE GASES PER POUND OF THE COAL FIRED | | | | | | |
|---|---|---|---|---|---|---|
| coal ingredient | lbs. burned | molecular weights chemical reactions | | | multiplier | lbs oxygen/ lb coal fired |
| CARBON | 0.6944 | 12<br>+<br>O | 32<br><br>$O_2$ | 44<br>→<br>$CO_2$ | 32/12 = 2.67 | 1.852 |
| HYDROGEN | 0.0480 | 4<br>+<br>$2H_2$ | 32<br><br>$O_2$ | 64<br>→<br>$2H_2O$ | 32/4 = 8 | 0.384 |
| SULPHUR | 0.03952 | 32<br>+<br>S | 32<br><br>$O_2$ | 64<br>→<br>$SO_2$ | 32/32 = 1 | 0.03952 |
| oxygen to burn a lb of the coal if it had none | | | | | | 2.27552 |
| subtract the oxygen in this coal | | | | | | 0.0826 |
| oxygen per above reactions to burn a lb of coal | | | | | | 2.1909 |
| add 24% excess air to assure complete combustion | | | | | | 0.5258 |
| GRAND TOTAL LBS OXYGEN REQUIRED PER LB COAL FIRED | | | | | | 2.7167 |
| ratio of nitrogen + argon/oxygen in dry air = 76.81/ 23.14 = 3.3193 so | | | | | | |
| nitrogen + argon in stack gas = 3.3193 × 2.7167 = | | | | | | 9.0175 |
| carbon dioxide/lb. coal = 0.6944 × 44/12 ($CO_2$/C) = | | | | | | 2.5461 |
| oxygen from air not combusted, i.e. 24% excess air (above) | | | | | | 0.5258 |
| water in air needed for combustion considering that there is 0.01657 $H_2O$ @ 50% humidity @ 77° F. = 0.01657 × 2.7167 × 100/23.14(air/$O_2$) = | | | | | 0.1945 | |
| adding water in coal (moisture) = | | | | | 0.1218 | |
| and adding water from $H_2$ burn 0.48 × 9 = | | | | | 0.4320 | |
| water in flue gas as gas, vapor or water | | | | | 0.7483 | 0.7483 |
| sulphur dioxide in flue gas = 0.03952 × 64/32 ($SO_2$/S) | | | | | | 0.0790 |
| GRAND TOTAL LBS FLUE GAS PER POUND OF COAL FIRED | | | | | | 12.9167 |
| CALCULATION OF COAL CONSUMPTION BASED ON: | | | | | | |
| 137.5 KW power plant<br>12,110 heating value<br>8762 Btu/kwh plant heat rate<br>so 137,500 kwh/hour × 8762/12,110 over 60 minutes =<br>1658 lb coal/minute<br>1194 tons coal/day | | | | | | |

Since air at 1 atm and 35° C. flows across a 5 cm diameter cylinder at a velocity of 50 m/sec. or 112 miles/hour, the heat transfer per unit length is therefore 3226 Btu/ft. In the water-tube boiler of the invention, 1 inch diameter steel boiler tubes are used. Thus, to convert the calculations for a 5 cm tube to a 1 inch one, I find that the heat transfer expected per foot length is reduced to 1613 Btu/ft. In the ¼ portion of the tube bundle shown in FIG. 2, the tube count is: 130 tubes×4×30 ft. long=15,900 ft. of tubing. It is also seen that 370° F. is about lowest temperature of the flue gas going to the stack according to conventional operation, whereas the invention will release 70° F. gas. Even with the lower heat transfer of the tubes of the present invention, an increased efficiency of heating of 1.21 can be expected. Using this information, it is seen that the present heat exchanger could transfer: 3226 Btu/ft×1.21×15,900 feet of tube=62,000,000 Btu beyond that of the conventional design.

The apparatus of FIG. 1 and FIG. 2 also has the capacity to profitably capture the poisonous air pollutants from the firing of coal in a power plant and make profitable byproducts therefrom and likewise make medium pressure steam convertible into hydroelectric power.

Companies that manufacture water-tube boilers for producing relatively low-pressure steam, i.e. less than about 600 psi, may chose boiler tubes of different diameters than those shown in FIG. 1 and FIG. 2. In any case, it is certain that such low pressure steam can be made from the heat in flue gas emanating from fossil fuel fired boilers.

This invention discloses an invention which could have saved substantial amounts of energy if put into commercial use years ago. The low pressure steam which is generated as a byproduct of treating the flue gas to remove pollutants can be advantageously used to operate hydroelectric generators or other power generating apparatus to increase the efficiency of the plant. For instance, in the text "Thermodynamics" by J. P. Holman, Third Edition, McGraw-Hill Book Company, line 8 of page 542 reads "The upper limit for [efficiency of] a fossil fuel plant is about 40%." In contrast in "PENDER DELMAR ELECTRICAL ENGINEERS HANDBOOK" third edition, 1936, pages 13–17, lines 9 & 10 read, "The maximum overall efficiency of a pumped storage plant from bus-bar incoming to bus-bar outgoing will vary from 60 to 70 per cent." This demonstrates that the present invention can increase the efficiency of a power plant while utilizing the steam generated from a pollution treatment process.

What I claim is:

1. A method for removing pollutants of sulfur, nitrogen, and metals from a flue gas containing the same, comprising the steps of:
   introducing an ammoniacal substance into the flue gas in an amount sufficient to react with substantially all of the sulfur and nitrogen;
   providing a heat exchanger having arrays of tubes arranged at an angle of between about 10 to 60 degrees from the horizontal, and a cooling fluid which passes through the tubes of the heat exchanger;
   directing the combined flue gas and ammoniacal substance past the array of tubes along a serpentine pathway relative to the tubes to cool the flue gas and condense the flue gas to form a condensate solution of ammonium sulfate or ammonium sulfite compounds from the flue gas;
   collecting and removing the condensate solution from the flue gas at several locations below the tubes along the pathway.

2. The process of claim 1 which further comprises condensing the flue gas to form a concentrated ammonium sulfate solution in the first location for collecting and removing condensate.

3. The process of claim 1, wherein the flue gas contains mercury, which further comprises condensing mercury from the flue gas in one of the lower locations for collecting and removing condensate.

4. The process of claim 1 which further comprises utilizing ambient temperature water as the cooling fluid and heating the cooling fluid to produce steam, wherein the temperature of steam produced is not less than 10° F. lower than the temperature of the entering flue gas.

5. The process of claim 4 which further comprises utilizing the steam to develop power for use in the plant.

6. The process of claim 5 which further comprises utilizing the steam to drive a fan, pump or electric generator to develop power.

7. The process of claim 6 which further comprises utilizing the steam to operate a reciprocating steam pump which pumps water to a hydroelectric generator at between about 5 and 1000 times the pressure per square inch of the steam.

8. The process of claim 1 wherein the ammoniacal substance is in a gaseous state and is introduced into the flue gas.

9. The process of claim 8 wherein the gaseous state of the ammoniacal substance is obtained by heating a solution of the ammoniacal substance.

10. The process of claim 9 wherein the ammoniacal substance is a solution of between about 0.5 to 20% by weight of ammonia or ammonium hydroxide and water.

* * * * *